(12) United States Patent
Allan

(10) Patent No.: US 8,971,190 B2
(45) Date of Patent: Mar. 3, 2015

(54) METHODS AND DEVICES FOR IMPLEMENTING SHORTEST PATH BRIDGING MAC MODE SUPPORT OVER A VIRTUAL PRIVATE LAN SERVICE NETWORK

(71) Applicant: Telefonaktiebolaget L M Ericsson (Publ), Stockholm (SE)

(72) Inventor: David Ian Allan, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 119 days.

(21) Appl. No.: 13/746,199

(22) Filed: Jan. 21, 2013

(65) Prior Publication Data

US 2014/0204762 A1   Jul. 24, 2014

(51) Int. Cl.
*H04L 12/28* (2006.01)
*H04L 12/721* (2013.01)
*H04L 12/751* (2013.01)

(52) U.S. Cl.
CPC ............... *H04L 45/12* (2013.01); *H04L 45/68* (2013.01); *H04L 45/02* (2013.01)
USPC .......................................... 370/238; 370/254

(58) Field of Classification Search
CPC .. H04W 40/22; H04W 40/242; H04L 49/354; H04L 12/4641; H04L 2012/5617; H04L 2012/5618
USPC ...................... 370/238, 252, 254, 255, 395.53
See application file for complete search history.

(56) References Cited

U.S. PATENT DOCUMENTS

| 8,005,081 | B2 | 8/2011 | Bragg et al. |
| 8,223,668 | B2 | 7/2012 | Allan et al. |
| 2010/0020797 | A1 | 1/2010 | Casey et al. |
| 2012/0076014 | A1* | 3/2012 | Bragg ........................... 370/252 |
| 2012/0106347 | A1* | 5/2012 | Allan et al. .................. 370/238 |

(Continued)

FOREIGN PATENT DOCUMENTS

WO   WO 2013/168054 A1   11/2013

OTHER PUBLICATIONS

Allan D. et al., "802.1aq and 802.1Qbp Support over EVPN; draft-allan-l2vpn-spbm-evpn-00.txt",802.1AQ and 802.1QBP Support Over EVPN; Draft-Allan-L2VPN-SPBM-EVPN-00.Txt, Internet Engineering Task Force, IETF; Standardworkingdraft, Internet Society (ISOC) 4, Rue Des Falaises Ch—1205 Geneva, Switzerland, Jul. 9, 2012, pp. 1-11, XP015083832, sections 3 and 4.4.

(Continued)

*Primary Examiner* — Brian D Nguyen

(57) ABSTRACT

Methods and devices for implementing Shortest Path Bridging over a VPLS network. The method includes determining, from IS-IS PDU information received by a PE switch, whether a DF configuration for the PE switch needs to be changed and, if so, the method further includes determining whether the PE switch remains a DF for one or more B-VIDs. If the PE switch is no longer a DF for one or more B-VIDs, the method further includes removing local DF associated information for the PE switch from each PW adjacency's LDP database, and removing, from a local IS-IS database, DF associated remote LDP information. The method also includes, if the PE switch has become a DF for one or more of the B-VIDs, adding, from the IS-IS database, local DF information for the PE switch to the LDP databases, and adding, from the LDB databases, DF associated remote information for the PE switch to the IS-IS database.

16 Claims, 6 Drawing Sheets

(56) References Cited

U.S. PATENT DOCUMENTS

| | | | |
|---|---|---|---|
| 2012/0177044 A1* | 7/2012 | Berman | 370/392 |
| 2012/0230199 A1* | 9/2012 | Chiabaut | 370/238 |
| 2013/0195111 A1* | 8/2013 | Allan et al. | 370/395.53 |
| 2013/0301472 A1* | 11/2013 | Allan | 370/254 |
| 2013/0322445 A1* | 12/2013 | Klein | 370/392 |
| 2013/0322453 A1* | 12/2013 | Allan | 370/395.53 |
| 2014/0112188 A1* | 4/2014 | Keesara et al. | 370/254 |
| 2014/0126422 A1* | 5/2014 | Bragg | 370/255 |

OTHER PUBLICATIONS

Lasserre et al. "Virtual Private LAN Service (VPLS) Using Label Distribution Protocol (LDP) Signaling" RFC 4762, pp. 1-32, Jan. 2007.

Muley P. et al. "Pseudowire Redundancy", Internet draft, pp. 1-19, Jun. 27, 2012.

IEEE 802.1aq: IEEE Standard for Local and Metropolitan Area Networks: Bridges and Virtual Bridged Local Area Networks—Amendment 9: Shortest Path Bridging, Feb. 19, 2008, the whole document.

* cited by examiner

US 8,971,190 B2

METHODS AND DEVICES FOR IMPLEMENTING SHORTEST PATH BRIDGING MAC MODE SUPPORT OVER A VIRTUAL PRIVATE LAN SERVICE NETWORK

TECHNICAL FIELD

The present invention relates generally to communication across a network, and more particularly, to methods and devices for implementing shortest path bridging MAC mode support over a virtual private LAN service network.

BACKGROUND

The IEEE 802.1aq standard (802.1aq), was published in 2012 and defines a routing solution for Ethernet that replaces prior routing solutions including Spanning Tree Protocols. 802.1aq is also known as Shortest Path Bridging or SPB. 802.1aq enables the creation of large numbers of logical Ethernet networks on native Ethernet infrastructures. 802.1aq employs a link state protocol (i.e., Intermediate System to Intermediate System (IS-IS)) to advertise network topology and logical network membership of the nodes in the network. The link state information is used to calculate shortest path trees from all bridges in the SPB region. The computations are done in an independent and distributed manner with each node generating its own forwarding tables to implement its part in SPB region-wide forwarding.

Data is encapsulated at the edge nodes of the networks implementing 802.1aq. This encapsulation can be in 802.1ah or tagged 802.1Q/p802.1ad frames. These frames are transported only to other members of the respective logical network. Unicast and multicast routing are also supported by 802.1aq. All such routing is done via symmetric shortest paths. Multiple equal cost shortest paths are supported. Implementation of 802.1aq in a network simplifies the creation and configuration of the various types of supported networks, including provider networks, enterprise networks and cloud computing networks. 802.1aq also increases bandwidth and reliability by improved use of the network mesh topology. By unblocking all paths, greater utilization can be obtained through the use of multiple equal cost paths. Improved convergence times and larger topologies can also be supported due to the simplification of synchronization of the view of the network across all nodes inherent to link state routing.

Virtual Private LAN Service (VPLS) is an approach to effecting Ethernet Virtual Private Networks (VPNs) over Multi-Protocol Label Switching (MPLS) networks. However, VPLS as currently specified does not provide for multiple unblocked attachment circuits for supporting SPB.

Prior VPLS implementations that support 802.1ah have typically only collocated the I-component with the PE and, as such, do not have a PBBN attached to any PE. Consequently, there is no means of supporting a backbone Ethernet networking component. Thus, in these prior systems there are no B-VIDs, and that function is null. There is no requirement for symmetric and congruent multicast trees, and VPLS itself is not necessarily congruent across an MPLS network. Therefore, in previous networks the unit of configured load spreading is the I-SID. VPLS supports "active-standby" multi-chassis uplinks (a.k.a., Multi-chassis Link Aggregation Group (MC-LAG)). Accordingly, there is a need to implement shortest path bridging support over a virtual private LAN service network to take advantage of SPB features with VPLS.

SUMMARY

Particular embodiments of the present invention are directed to methods and devices for implementing shortest path bridging MAC mode support over a virtual private LAN service network.

According to certain embodiments, a method is provided for implementing Shortest Path Bridging (SPB) over a Virtual Private LAN Service (VPLS) network. The method includes receiving, by a provider edge (PE) switch, Intermediate System-Intermediate System (IS-IS) protocol data unit (PDU) information. The method further includes determining, from the received IS-IS PDU information, whether a Designated Forwarder (DF) configuration, which may be for a given Backbone-Virtual Local Area Network Identifier (B-VID), for the PE switch needs to be changed and, if the DF configuration needs to be changed, the method further includes determining whether the PE switch remains a DF for one or more B-VIDs. If the PE switch is no longer a DF for one or more B-VIDs, the method further includes removing all local DF associated information from each pseudowire (PW) adjacency's LDP database associated with the PE switch, and removing, from a local IS-IS database, all DF associated remote LDP information for the set of remote PBBNs associated with the PE switch. The method also includes determining whether the PE switch has become a DF for one or more of the B-VIDs and, if the PE switch has become a DF for one or more of the B-VIDs, the method further includes adding, from the IS-IS database, all local DF information for the PE switch to the one or more LDP databases, and adding, from the one or more LDB databases, all DF associated remote Shortest Path Bridging MAC Mode (SPBM) information for the PE switch to the IS-IS database.

In accordance with certain embodiments, the method further includes determining whether the PE switch is a DF for any B-VID. If the PE switch is a DF for any B-VID, the method further including determining whether the received IS-IS PDU information includes a new Shortest Path Bridging MAC Mode (SPBM) service identifier or changed unicast address sub-TLV information. If the IS-IS PDU information includes a new SPBM service identifier or changed unicast address sub-TLV information, the method further includes adding, from the IS-IS database to the one or more LDP databases, the new SPBM service identifier or changed unicast address sub-TLV information.

Particular embodiments further provide a multiprotocol label switching (MPLS) provider edge (PE) switch for implementing Shortest Path Bridging (SPB) over a Virtual Private LAN Service (VPLS) network. The PE switch includes a processor; a memory coupled to the processor; and a transceiver coupled to the processor. The processor is configured to receive Intermediate System-Intermediate System (IS-IS) protocol data unit (PDU) information, including an IS-IS Type Length Value (TLV) and to determine, from the received IS-IS PDU information, whether a Designated Forwarder (DF) configuration, which may be for a given Backbone-Virtual Local Area Network Identifier (B-VID), for the PE switch needs to be changed. If the DF configuration needs to be changed, the processor is further configured to determine whether the PE switch remains a DF for one or more B-VIDs. If the PE switch is no longer a DF for one or more B-VIDs, the processor is further configured to remove all local DF associated information from each pseudowire (PW) adjacency's LDP database associated with the PE switch, and to remove, from a local IS-IS database, all DF associated remote LDP information for the set of remote PBBNs associated with the PE switch. The processor is also configured to determine whether the PE switch has become a DF for one or more of the B-VIDs and, if the PE switch has become a DF for one or more of the B-VIDs, the processor is further configured to add, from the IS-IS database, all local DF information for the PE switch to the one or more LDP databases, and to add, from the one or more LDB databases, all DF associated remote Shortest Path Bridging MAC Mode (SPBM) information for the PE to the IS-IS database.

In certain embodiments, the processor is further configured to receive LDP information from a peer node and to determine whether the received LDP information includes new information regarding PW adjacencies. If the LDP information includes new information regarding PW adjacencies, the processor is further configured to determine whether the PE switch is a DF for an I-Component Service Identifier (I-SID) associated with the received LDP information. If the PE switch is a DF for an I-SID associated with the received LDP information, the processor is further configured to add the received SPB information associated with the PW adjacency to the IS-IS database.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Particular embodiments are directed to methods and devices for implementing shortest path bridging support over a virtual private LAN service network.

In the following description, numerous specific details are set forth. However, it is understood that embodiments of the invention may be practiced without these specific details. In other instances, well-known circuits, structures and techniques have not been shown in detail in order to not obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams are described with reference to the exemplary structural embodiments illustrated in the figures. However, it should be understood that the operations of the flow diagrams can be performed by structural embodiments of the invention other than those discussed with reference to figures, and the embodiments discussed with reference to figures can perform operations different than those discussed with reference to the flow diagrams.

As used herein, a network element (e.g., a router, switch, bridge, etc.) is a device, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber, or user, end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service; and may include public web pages (free content, store fronts, search services, etc.), private web pages (e.g., username/password accessed web pages providing email services, etc.), corporate networks over VPNs, Internet Protocol Television (IPTV), etc. Typically, subscriber end stations are coupled (e.g., through customer premise equipment coupled to an access network (wired or wirelessly)) to edge network elements, which are coupled (e.g., through one or more core network elements to other edge network elements) to other end stations (e.g., server end stations).

Figure 1:
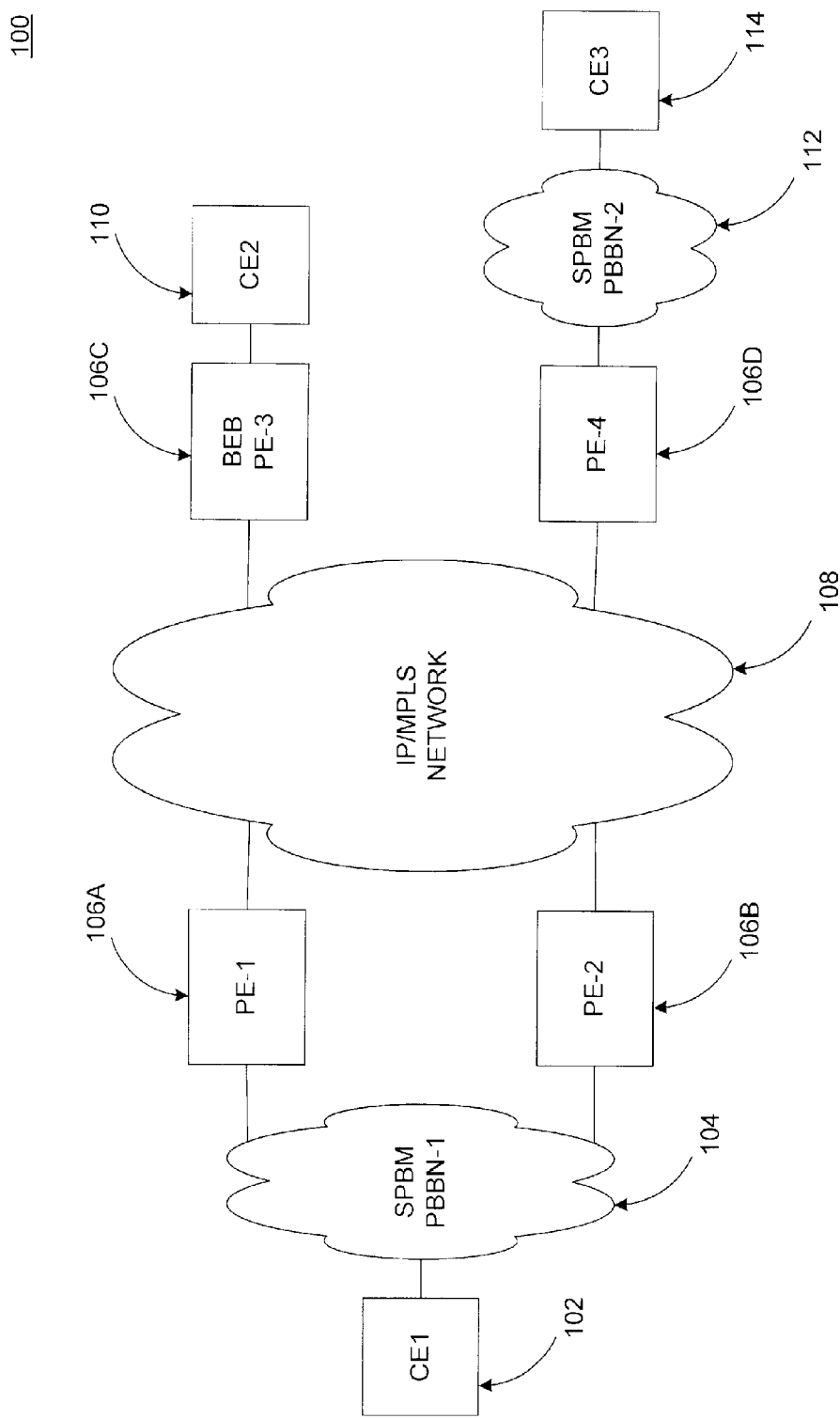
FIG. 1 illustrates an architecture of a communication system for implementing shortest path bridging over a virtual private LAN service network.

Referring now to FIG. 1, an architecture of a communication system 100 for implementing shortest patch bridging over a virtual private LAN service network in accordance with exemplary embodiments of the present invention, is illustrated. The network 100 can include any number of customer edge equipment (CE) nodes 102, 110, 114 that are devices that connect a local area network (LAN) or similar set of customer devices with the SPBM-PBBN 104. The CE 102, 110, 114 can be any type of networking router, switch, bridge or similar device for interconnecting networks.

The SPBM-PBBN 104, 112 is a set of network devices such as Ethernet switches forming a provider backbone network that implements shortest path bridging MAC mode. This network 104, 112 can be controlled by entities such as internet service providers and similar entities. CEs 102 subtending from SPBM-PBBN-1 104 can be connected to other CDs 114 via any number of other SPBM-PBBNs (such as SPBM-PBBN-2 112), or CEs 110 subtending other than a local SPBM-PBBN via a Backbone Edge Bridge (BEB-PE) 106C, or similar networks or devices over an IP/MPLS 108 network or similar wide area network. These networks 104, 108, 112 can interface through any number of PEs 106A-D. The modification of the PE 106A-D to support 802.1aq over VPLS within the SPBM-PBBN network is described further below. The illustrated network 100 of FIG. 1 is simplified for sake of clarity. One skilled in the art would understand that the network 100 can have any number of CEs 102, 110, 114, PBBNs 104, 112, and PEs 1106-D, where any given PBBN 104, 112 can connect with the IP/MPLS network 108 through any number of PEs 106.

Embodiments of the present invention incorporate control plane interworking in the PE 106 to map IS-IS Shortest Path Bridging (ISIS-SPB) information elements into VPLS information encoded and communicated via LDP and vice versa for directing data packets across the network according to SPB. Associated with this process are procedures for configuring the forwarding operations of the PE 106 such that an arbitrary number of VPLS subtending SPBM-PBBNs 104, 112 may be interconnected without any topological or multi-pathing dependencies. These embodiments also permit a co-located BEB and PE (PBBN-PE) 106C to seamlessly communicate with the SPBM-PBBNs 104, 112. These embodiments can be extended to support the future 802.1Qbp standard, permitting seamless interworking between 802.1ah, 802.1aq, and 802.1Qbp as well as supporting subtending 802.1ad-based PBBNs.

The combination of the SPBM-PBBN facing interfaces or virtualized BEB instances bound to the mesh of PWs in the MPLS network set up via the Label Distribution Protocol (LDP) inherently identifies the set of SPBM-PBBNs 104, 112 and BEB-PEs 106C that are allowed to communicate. A LDP database acts as a common repository of the I-SID attachment points for the set of subtending PEs 106/PBBNs 104, 112, i.e., the set of PBBN-PEs 106 and the SPBM-PBBNs that are interconnected via VPLS. These attachment points are in the form of B-MAC address, I-SIDs (with Tx-Rx-attribute tuples) stored in the local LDP database of the PE 106. The Control Plane (CP) interworking function filters the leaking of I-SID information in the LDP database into the local PBBN-PE implementation or the local ISIS-SPB routing instance within each PBBN 104, 112 on the basis of locally registered interest. Leaking as used herein refers to the selective filtering of which LDP information is transferred to the local IS-IS database for the PE 106. If a PBBN 104, 112 has no BEBs 106C registering interest in an I-SID, information about that I-SID from other PBBNs 104, 112 or PBBN-PEs 106C will not be leaked into the local ISIS-SPB routing system by the PE that is the DF for the B-VID with which the I-SID is locally associated, as extracted from the LDP information received from the other peer PEs.

Each PE attached to a given PBBN is administratively configured to know who the other local PEs are. In addition, it is possible to envision additional identifiers encoded in LDP explicitly to permit nodes to discover the set of local peers via LDP exchange. For each B-VID in an SPBM-PBBN 104, 112, a single PE 106A-D in the set of PEs attaching the SPBM-PBBN to the VPLS network is elected as the designated forwarder (DF) for the B-VID. A PE 106A-D may be a DF for more than one B-VID. This DF determination may be achieved via configuration or via algorithmic techniques, with the algorithmic approach being the preferred embodiment. In some embodiments, the network 100 is configured to ensure a change in the designated forwarder is only required in cases of PE 106A-D failure or severing connection from either the PBBN 104, 112 or MPLS network 108 to minimize churn (i.e., the overhead data load caused by LDP messaging and similar activity to reconfigure the network to utilize a different PE 106 as the DF) in the LDP-VPLS.

In certain embodiments, a backbone edge bridge (BEB) encodes a Backbone Media Access Control (B-MAC) address and I-Component Service Identifier (I-SID) as a sub-TLV in LDP PDUs associated with each PW In IEEE 802.1aq networks, a link state protocol is utilized for controlling the forwarding of Ethernet frames on the network 100. One link state protocol, the Intermediate System to Intermediate System (IS-IS), is used in 802.1aq networks for advertising both the topology of the network and logical network membership. 802.1aq has two modes of operation. A first mode for Virtual Local Area Network (VLAN)-based networks is referred to as Shortest Path Bridging VLAN mode (SPBV). A second mode for MAC based networks is referred to as Shortest Path Bridging MAC Mode (SPBM). Both SPBV and SPBM networks can support more than one set of Equal Cost Forwarding Trees (ECT) simultaneously in the data plane. An ECT set is commonly associated with a number of shortest path VLAN identifiers (SPVIDs) forming a SPVID set for SPBV, and associated 1:1 with a Backbone VLAN ID (B-VID) for SPBM.

According to the 802.1aq MAC mode specification, network elements in the provider network are to be configured to perform multipath forwarding of data traffic separated by B-VIDs so that different frames addressed to the same destination address, but mapped to different B-VIDs, can be forwarded over different paths (referred to as "multipath instances") through the network 100. A customer data frame associated with a service is to be encapsulated in accordance with 802.1aq with a header that has a separate I-SID and B-VID. This separation permits the services to scale independently of network topology. Thus, the B-VID can be used exclusively as an identifier of a multipath instance. The I-SID identifies a specific service to be provided by the multipath instance identified by the B-VID. The actual routing of multipath instances in an 802.1aq network is determined by shortest path routing augmented with deterministic tie breaking based on each node's system IDs.

Figure 2:
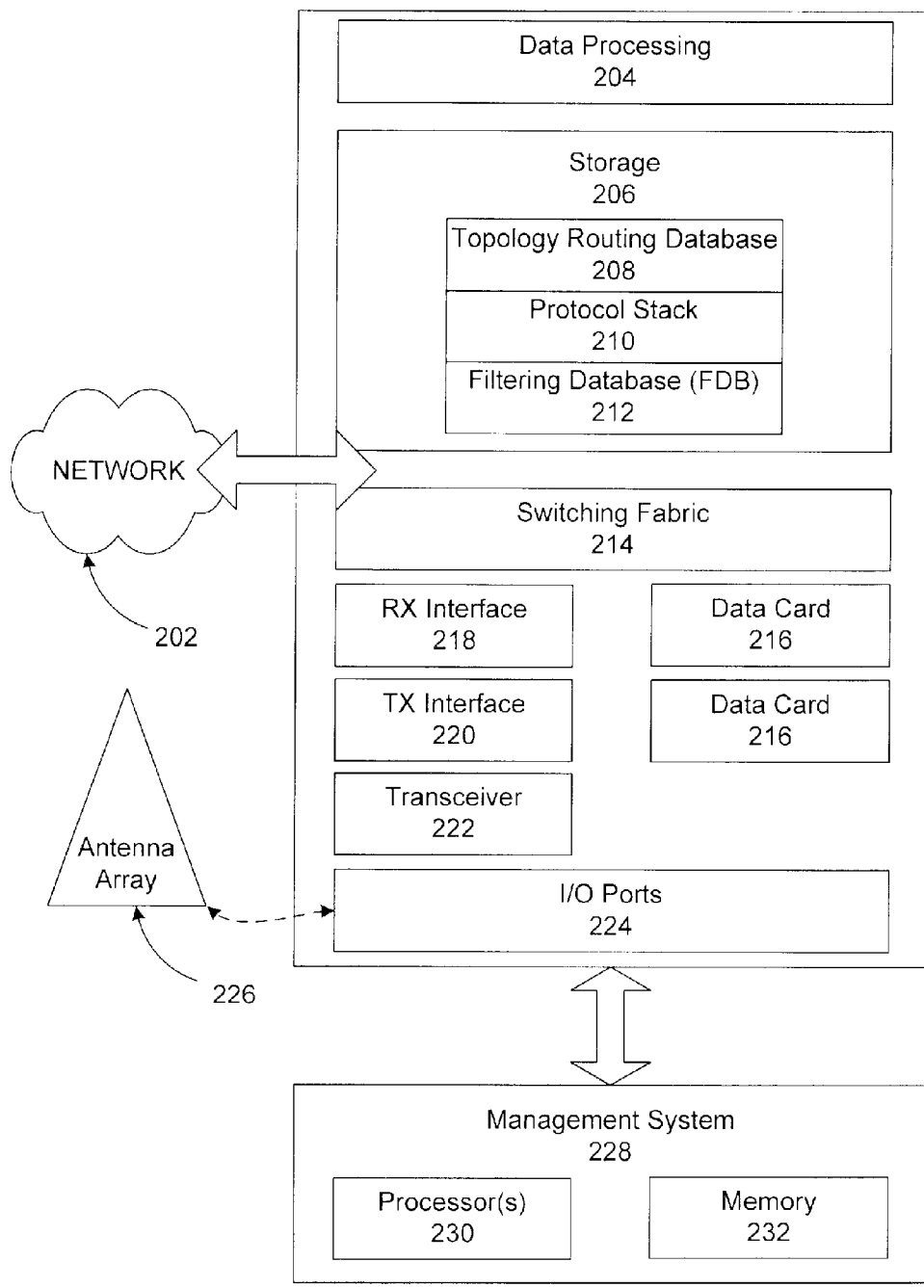
FIG. 2 is a block diagram of a provider edge switch, as used in the system of FIG. 1, in accordance with exemplary embodiments of the present invention.

VPLS is an Ethernet over MPLS VPN protocol solution that can use LDP to disseminate VPN and MAC information and uses MPLS as the transport protocol. Embodiments of the present invention seeks to interconnect subtending 802.1.aq networks (referred to as SPBM-PBBNs), while operationally decoupling the SPBM-PBBNs, by minimizing (via need-to-know filtering) the amount of state, topology information, nodal nicknames, and B-MACS that are leaked from LDP into the respective subtending SPBM-PBBN IS-IS control planes. These embodiments also aim to decouple network design permitting a distinct number of locally optimized multi-pathing instances in each subtending SPBM-PBBN. These embodiments also minimize the amount of configuration required. The embodiments provide a mechanism and procedures for properly resolving the presence of a B-MAC in more than one B-VID once B-VID context has been removed. The embodiments also enable BEB B-MACs to exist in multiple B-VIDs in MSTP-controlled networks (802.1ah) as well as IS-IS (802.1aq) controlled Ethernet networks Referring now to FIG. 2, a block diagram of a network element, including a provider edge switch 106, as used in the network system 100 of FIG. 1 in accordance with exemplary embodiments of the present invention, is illustrated. The network element 106 includes a control plane, which includes a data processing system 204, which may include one or more microprocessors and/or one or more circuits, such as an application specific integrated circuit (ASIC), field-programmable gate arrays (FPGAs), and the like. The one or more microprocessors can include control logic configured to handle the routing, forwarding, and processing of the data traffic. The one or more microprocessors can also be configured to perform split tiebreaker functions for spanning tree root selection, compute and install forwarding states for spanning trees, compute Shortest Path Forwarding (SPF) trees upon occurrence of a link failure, populate a Filtering Database (FDB) 212 for data forwarding. Other processes may be implemented in the control logic as well.

The data processing system 204 can include a memory, which can include one or more non-volatile storage devices and/or one or more volatile storage devices (e.g., random access memory (RAM)). In embodiments where the data processing system 204 includes a microprocessor, computer readable program code may be stored in a computer readable medium, such as, but not limited to, magnetic media (e.g., a hard disk), optical media (e.g., a DVD), memory devices (e.g., random access memory), and the like. In some embodiments, computer readable program code is configured such that when executed by a processor, the code causes the network element 106 to perform steps described below (e.g., steps described below with reference to the flow charts shown in FIGS. 5 and 6). In other embodiments, network element 106 is configured to perform the steps described herein without the need for code. That is, for example, data processing system 204 may consist merely of one or more ASICs. Hence, the features of the present invention described above may be implemented in hardware and/or software. For example, in particular embodiments, the functional components of the network element 106 described above may be implemented by the data processing system 204 executing computer instructions, by the data processing system 204 operating independent of any computer instructions, or by any suitable combination of hardware and/or software.

The network element 106 also includes storage 206, which may include one or more non-volatile storage devices and/or one or more volatile storage devices (e.g., random access memory (RAM)). The storage 206 can store various files and databases, such as a Topology Routing Database 208, a Protocol Stack 210, and a Filtering Database (FDB) 212. The topology routing database 208 stores a network model or similar representation of the network topology, including the link states of the network. The FDB 212 stores forwarding states of the network element 106 in one or more forwarding tables, which indicate where to forward traffic incoming to the network element 106.

The network element 106 may also include a data plane comprising a switching fabric 214, one or more data cards 216, a receiver (Rx) interface 218, a transmitter (Tx) interface 220 and I/O ports 224. The Rx and Tx interfaces 218 and 220 interface with links within the networks 104, 108, and 112 through the I/O ports 224 for the transmission and reception of data via one or more antennas 226. Alternately, the transmission and reception functions can reside in a combined transceiver 222, which would also be connected with the antenna 226. If the network element is a provider edge switch 106, the I/O ports 224 also include a number of user-facing ports for providing communication from/to outside the network. The data cards 216 perform functions on data received over the interfaces 218 and 220, and the switching fabric 214 switches data between the data cards 216 and the I/O ports 224.

In certain embodiments, the network element 106 can be coupled to a management system 228. The management system 228 can include one or more processors 230 coupled to a memory 232. The processors 230 include logic to configure the system IDs and operations of the network element 106, including updating the system IDs to thereby shift work distribution in the network, assign priority to a subset of spanning trees such that the non-blocking properties of the network are retained for at least these spanning trees. In exemplary embodiments, the management system 228 may perform a system management function that computes forwarding tables for each network node and then downloads the forwarding tables to the network nodes. The system management function is optional; and, in an alternative embodiment, a distributed routing system may perform the computation where each network node computes its own forwarding tables.

Figure 3:
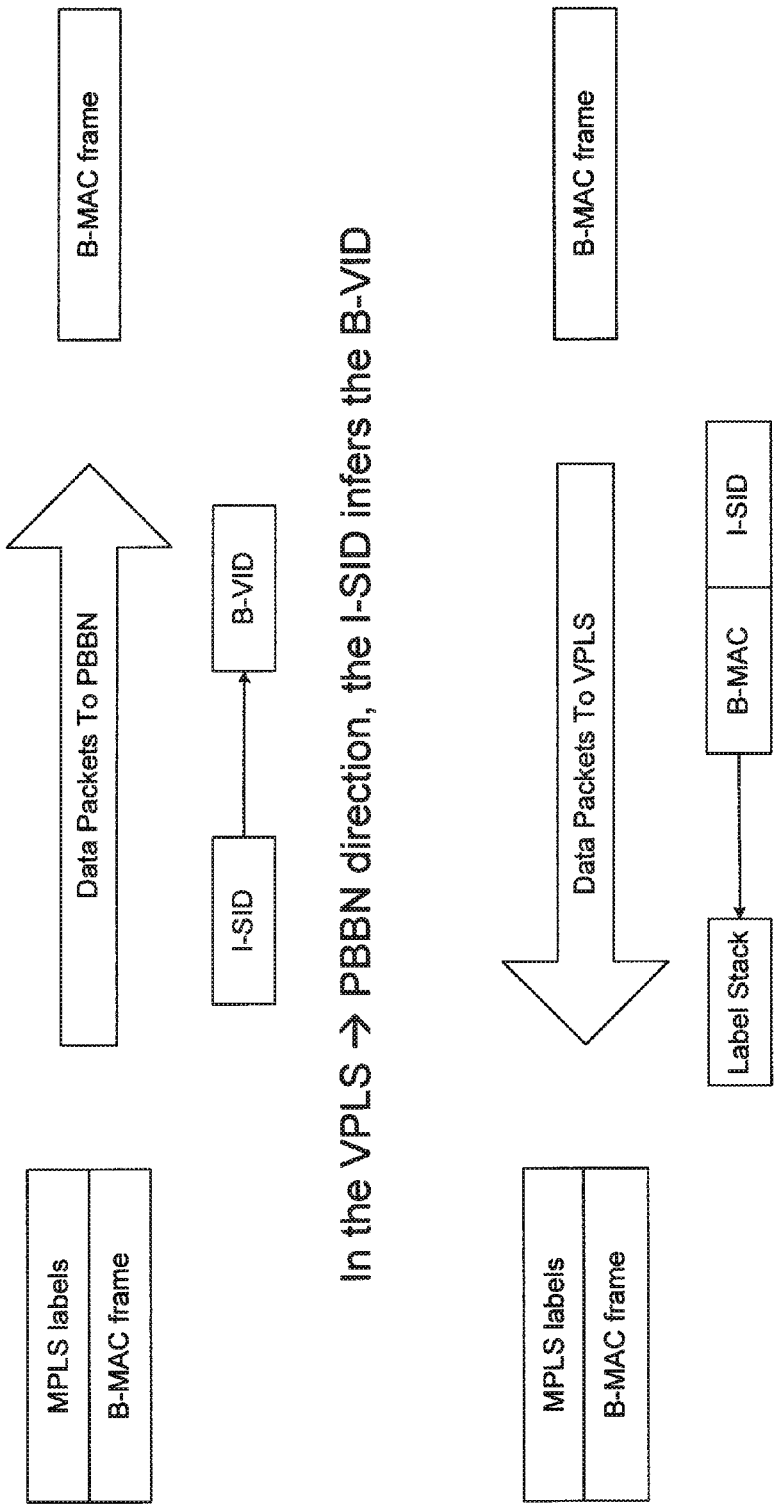
FIG. 3 is a block diagram illustrating the processing of data frames as they are translated from a Provider Backbone Bridged Network (PBBN) to a Virtual Private LAN Service (VPLS) network and from a VPLS network to a PBBN.

Referring now to FIG. 3, a block diagram of the processing of data frames as they are translated from a PBBN to a VPLS network and from a VPLS network to a PBBN in accordance with exemplary embodiments, is illustrated. When a SPBM data frame arrives at a PE 106, intended for a destination reachable by the VPLS network, the DA B-MAC and I-SID are looked up in the interworking table, and the MPLS label stack to prepend to the frame is determined, at which point the frame is then referred to as a packet. This label stack will typically be, but is not limited to, a PW label and a Packet-Switched Network (PSN) label. The packet is then forwarded accordingly. If the frame is a multicast frame, this process may be repeated for a number of copies of the packet, such that the packet can be sent over each PW with a LDP registered receive interest in the I-SID. A packet arriving from VPLS network will have the local B-VID inferred via I-SID lookup. The MPLS information is stripped from the front of the Ethernet frame, and B-VID field in the frame is updated. If the frame has a multicast DA B-MAC, then the Organizationally Unique Identifier (OUI) field in the destination MAC address is overwritten with the SPB Source ID, and the local bits are updated according to local values prior to the frame being forwarded.

When a PE 106 receives a LDP TLV containing new information, the PE 106 checks if the I-SID in the TLV maps to the B-VID for which the PE 106 is an elected DF. If no BEBs in the SPBM PBBN have advertised any interest in the I-SID, it will not be associated with any B-VID locally, and it will therefore be presumed to not be of interest. If the I-SID is of local interest to the SPBM PBBN 104, 112, and the PE 106 is the DF for that I-SID, a SPBM service identifier and unicast address sub-TLV is constructed/updated for advertisement into IS-IS and is added to the local IS-IS database. The SPB-TLV information from LDP that is advertised into IS-IS is also used to locally populate a forwarding table indexed by B-MAC/I-SID that points to the label stacks to impose on the SPBM frame. The bottom label of each stack being that of a specific PW to a far end SPBM network or BEB-PE.

When a PE 106 receives a frame from the SPBM-PBBN 104, 112 in a B-VID for which it is a DF, the PE 106 looks up the B-MAC/I-SID information to determine the label stack to be added to the frame for forwarding in the VPLS for each PW. The PE 106 adds the label information to the frame and forwards the resulting MPLS packet.

When a PE 106 receives a packet from the VPLS it may infer the B-VID to overwrite in the SPBM frame from the I-SID. If the frame has a multicast DA, the PE 106 overwrites the nickname in the frame with the local nickname (SPB Source ID). There is also a dataplane component whereby the B-VID is stripped going from PBBN to VPLS; or, on the basis of I-SID, the B-VID is added going from VPLS to PBBN.

A BEB-PE 106C actually has no subtending PBBN nor concept of a B-VID, so no extra frame processing is required. A PBBN-PE 106C is required to accept SPBM-encoded multicast DAs as if they were 802.1ah-encoded multicast DAs. The only information of interest in the destination MAC address is that it is a multicast frame, and the I-SID that is encoded in the lower 24 bits.

Figure 4:
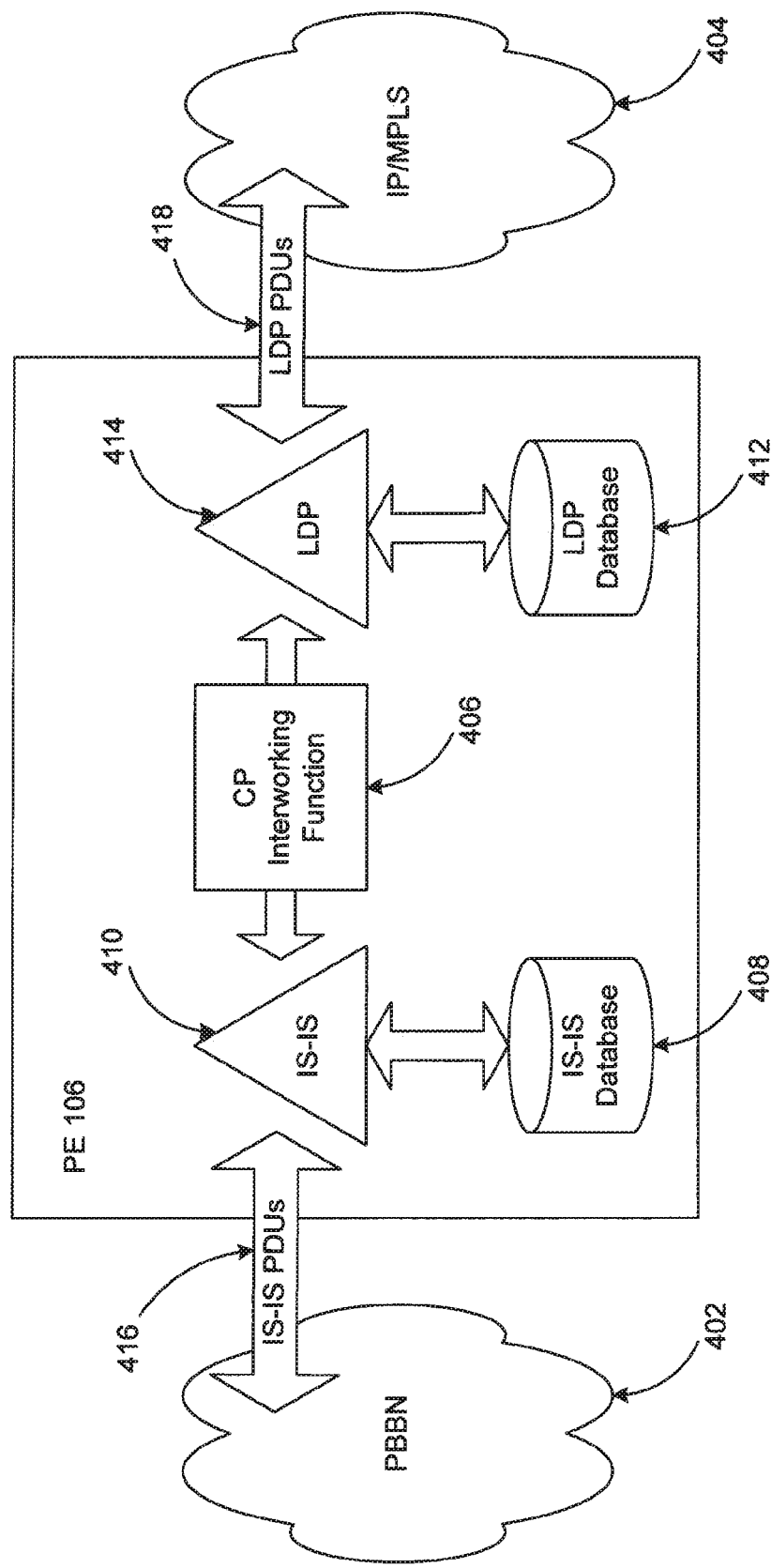
FIG. 4 is a block diagram of a provider edge (PE) switch, as used in the system of FIG. 1, in accordance with exemplary embodiments of the present invention.

Referring now to FIG. 4, a block diagram of a provider edge (PE) switch 106A-D as used in the network system 100 of FIG. 1, in accordance with exemplary embodiments, is illustrated. The PE 106 is connected through one interface 416 with the PBBN 104, 112, 402 and through a second interface 418 with the IP/MPLS network 404, 108. The PE 106 includes an IS-IS module 410, a control plane (CP) interworking function 406, a LDP module 414, an IS-IS database 408 and a LDP database 412.

The IS-IS module 410 receives and transmits IS-IS protocol data units (PDUs) over the IS-IS PDUs interface 416 to maintain topological and similar network information so as to enable the forwarding of data packets over the PBBN 402. The LDP module 414 similarly receives and transmits LDP PDUs over the LDP network interface 418 to maintain topological and similar network information for the IP/MPLS network 404, 108.

The CP interworking function 406 exchanges information between the IS-IS module 410 and the LDP module 414 to enable the proper forwarding of data and to enable the implementation of 802.1aq shortest path bridging over VPLS. Control plane interworking for ISIS-SPB to the VPLS network is utilized when a PE 106 receives an SPBM service identifier and an unicast address sub-TLV as part of an ISIS-SPB-capable TLV. The PE 106 checks whether it is the DF for the B-VID in the sub-TLV. If the PE 106 is the DF, and if there is new or changed information, then LTV information is created for each new I-SID in the sub-TLV. The Ethernet tag ID contains the I-SID (including the Tx/Rx attributes). The encoding of I-SID information is shown in the following table:

```
   0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|T|R| Reserved  |            I-SID                              |
+-+-+-+-+-+-+-+-+-+-+-+-+-+-+-+-+-+-+-+-+-+-+-+-+-+-+-+-+-+-+-+-+
```

Once this information has been formatted, the LDP is used to exchange this information with each peer PE in the PW mesh associated with the port or virtual BEB of arrival.

The PE 106 configuration can occur at PBBN 104, 112, 402 commissioning. A PE 106 is configured with standard SPBM information: a nodal nickname (SP Source ID) used for algorithmic construction of multicast Destination Address (DA) addresses; the set of B-VIDs used in the PBBN 104, 112; and multi-pathing algorithm IDs to use.

According to certain embodiments, each PE 106 can implement the following exemplary DF election process for itself. In one embodiment, a PE 106 self appoints in the role of DF for a B-VID for a given PBBN 104, 112. This process is implemented where the PE 106 notes the set of peers attached to the local SPBM-PBBN with which it has an active LDP adjacency. For each B-VID in the PBBN 104, a ranked list is produced, as well as a corresponding ranked list of the IP addresses of the local set of peer PEs. The B-VIDs are then assigned to the PEs. There will typically be more B-VIDs than PEs, so the ranked mapping will wrap. For example, if there are 6 B-VIDs and 3 PEs, then the mapping will be 1→1 2→2 3→3 4→1 5→2 6→3.

Exemplary embodiments for implementing shortest path bridging support over a virtual private LAN service network are described below, with specific process flow steps discussed below with reference to FIGS. 5 and 6. In certain embodiments, an interworking between LDP and SPBM IS-IS is assumed. A VPLS PE 106 can translate between LDP/MPLS 404 on the VPLS side and standard 802.1aq SPB on the PBBN 402 side. In these exemplary embodiments, co-located BEB/PEs 106C can fully participate in a larger set of SPBM PBBNs 104, 112. These embodiments offer a solution for mapping existing S-tagged PBBNs 104, 112 into an VPLS instance. In particular embodiments, the B-VID is pinned. The provisioning to pin individual I-SIDs can result in a large amount of configuration processes, and it is possible in embodiments outside the scope of this invention to configure the DFs such that a B-MAC appears in multiple PEs in the same B-VID in the same PBBN, and thus produce an unworkable result.

In contrast, the particular embodiments disclosed herein provide that a sole PE 106 is elected a DF for a given B-VID in the PBBN 104, 112. A given PE 106 is designated the transit device for the set of I-SIDs associated with a given B-VID. The PE 106 inherits the B-VID designation and advertises the PE 106 as the DF for all I-SIDs advertised by the SPBM-PBBN 104, 112 for that B-VID in that segment (note that a given I-SID value only exists in a single B-VID at a given time in a SPBM-PBBN 104, 112).

In these embodiments, the PE 106 logically appears as a BEB 106C in the PBBN 104, 112. If other VPLS connected segments have advertised an I-SID that corresponds to an I-SID registered in the local PBBN 104, 112; and if the PE 106 is the DF for the B-VID with which that I-SID is associated, then the PE 106 advertises remote I-SID interest into ISIS-SPB. Otherwise, the PE 106 remains silent. This process keeps the global I-SID table out of the individual ISIS-SPB instances.

In the control plane interworking operation between ISIS-SPB and LDP, data elements are received by the PE 106 from other LDP speakers. A PE 106 has already determined whether it is a DF for a B-VID by the DF election procedures. A PE 106 learns the local I-SID/B-VID bindings in the PBBN 104, 112 from IS-IS. A PE 106 accepts the SPBM-PBBN advertisements received from LDP. If the PE 106 does not have local knowledge of the I-SID (no registered interest in the local PBBN 104, 112), it simply retains the LDP information for future use. If the PE 106 is a DF for the I-SID (i.e., the I-SID associated with the B-VID for which the PE 106 is a DF) then the PE 106 adds an entry to the VPLS mapping table, B_MAC/I_SID points to a label stack that contains the MPLS label from the SPBM-PBBN advertisement, and the label for the Forwarding Equivalence Class (FEC) is advertised in the SPBM-PBBN advertisements. The PE 106 formulates an "SPBM service identifier and unicast address sub-TLV" containing the B-MAC, list of I-SIDs associated with the B-MAC in the LDP tables, and the base VID (B-VID associated with the I-SID learned from the ISIS) and adds this information to the IS-IS database 408. This process can involve adding the I-SID to an existing IS-IS sub-TLV as a means of updating the IS-IS database 408. An additional loop avoidance integrity check would be to ensure that such a record did not already exist associated with another BEB in the local PBBN (which would imply a race condition) and deferring such an update of ISIS until such a record was removed.

In the control plane interworking operation for SPBM, a service identifier and unicast address sub-TLV are received by the PE 106 from another IS-IS speaker in the PBBN 104, 112. The PE 106 checks if it is the DF for the B-VID in the sub-TLV. If the PE 106 is a DF for a B-VID, the PE 106 then formulates LDP information elements for each I-SID listed in the TLV not seen before, where a Tag ID=I-SID and I-SID Tx/Rx attributes, and where a MAC address is the B-MAC address from the sub-TLV.

In the data plane operation for the VPLS to PBBN SPB interworking, as shown in FIG. 3, all MPLS unicast packets arriving at the PE 106 from the VPLS MPLS network 404, 108 have the B-VID to overwrite in the frame. This can be inferred from the MPLS label (if it is has been uniquely advertised for all I-SIDs in a single B-VID) or from the I-SID. All MPLS multicast packets arriving at the PE 106 from the VPLS have the B-VID inferred from the I-SID as the label is source administered, not destination administered, and therefore cannot be overloaded to infer B-VID as well. All data packets with an Ethernet multicast Destination Address (DA) have the Organizationally Unique ID (OUI) portion of the DA-MAC overwritten with the local SPBM nodal nickname (SP Source ID) for the PE 106, and the local address bit is set if in an SPBM PBBN. If the PE 106 is a co-located BEB and PE (PBBN-PE 106C), the standard OUI for 802.1ah I-SID multicast trees is included, and the local address bit is cleared.

In the data plane operation for the PBBN to VPLS interworking, as shown in FIG. 3, unicast frames arriving at a PE 106 have the B-MAC/I-SID tuple looked up to determine the MPLS label stack to apply to the data packet. Frames with multicast DAs have the I-SID looked up and are either locally replicated to each PE 106 with registered interest in the I-SID, or mapped to a multicast group corresponding to the I-SID community of interest depending on what multicast capability is integrated into the VPLS implementation.

The other PEs 106 need to know when a DF for a B-VID has failed. This can be accomplished by monitoring the LDP adjacencies with the local peer PEs. Similarly, a PE which is severed from the SPBM-PBBN network needs to explicitly allow its LDP adjacencies to fail as it can no longer offer transit and interworking between the SPBM and MPLS networks.

These particular embodiments provide a solution for ensuring a B-MAC in a given B-VID only appears at only one PE 106 in a PBBN 104, 112, thereby ensuring that there is no forwarding ambiguity that existing Ethernet hardware cannot handle. These embodiments function such that a PE 106 can steer traffic to an appropriate peer PE 106. The algorithmic pinning of a peer B-VID DF as part of normal control plane (CP) interworking operation minimizes the amount of potential configuration of PEs 106. The pinning of a peer B-VID DF isolates the LDP VPLS from churn overhead and from routing instability in the individual PBBNs 104, 112. These embodiments are compatible with existing PBBN-VPLS models, require no complex interworking, and can interwork with full loop avoidance.

Figure 5:
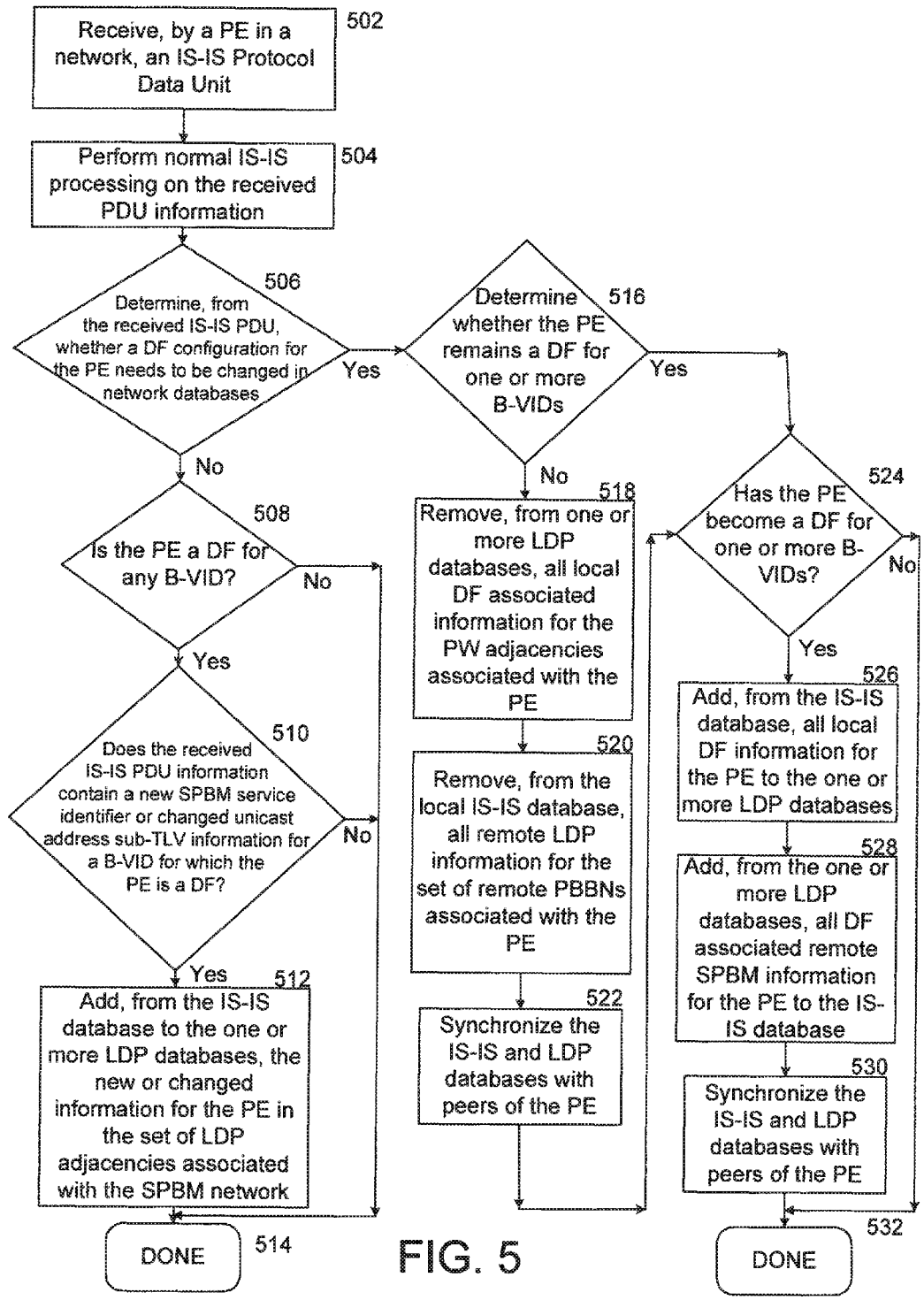
FIG. 5 is a flowchart illustrating the steps performed by a PE switch in methods for implementing shortest path bridging over a VPLS network in accordance with exemplary embodiments of the present invention.

Referring now to FIG. 5, a flowchart of the steps performed by a provider edge switch 106 in methods for implementing shortest path bridging over a VPLS network, in accordance with exemplary embodiments, is illustrated. FIG. 5 can also be perceived as illustrating an exemplary process of interworking the 802.1aq SPB control plane with the VPLS LDP control plane, whereby a technique for electing designated forwarders (DF) for a given B-VID in the local PBBN 104, 112 determines which PE 106 uniquely transfers specific I-SID and MAC information for the B-VID from IS-IS into LDP and what (by direct inference from local I-SID to B-VID mappings) I-SID and MAC information in LDP is leaked from LDP into IS-IS as associated with the specific PE 106. The technique is primarily focused on selecting one PE as a designated forwarder for each B-VID in the local PBBN.

The method is initiated at step 502 when an IS-IS Protocol Data Unit (PDU) is received by a PE 106, whereby the PDU may include an IS-IS Type Length Value (TLV). The received IS-IS PDU data is processed in the normal IS-IS protocol procedure at step 504. The method further includes validating the configured local multipath configuration as a consequence of IS-IS hello exchange. A check is made at step 506 to determine, from the received IS-IS PDU data, whether a change in the current configuration of designated forwarders (DFs), which may be for a given B-VID, for the PEs 106 needs to be effected in the interworking function (e.g., has there been a change in RD in the ESI for the RT?). If a change is required, then a determination is made at step 516 regarding whether the present PE 106 remains a DF for one or more B-VIDs. If the PE 106 was, but as a consequence of changed network state should no longer be a DF for one or more B-VIDs, then all local DF associated information from the Pseudowire (PW) adjacency's LDP database 412 associated with that PE 106 is removed at step 518, and all DF associated remote LDP information for the set of remote PBBNs associated with that PE 106 is removed at step 520 from the local IS-IS database 408. The IS-IS database 408 and the LDP databases 412 are then synchronized at step 522 with peers of the PE 106, and processing is then transferred to step 524, as discussed below.

If the PE 106 is determined at step 516 to be a DF for one or more B-VIDs, then a check is made at step 524 to determine whether the PE 106 was not, but has recently become a DF for one or more B-VIDs. If the PE 106 has become a DF for one or more B-VIDs, then all local DF information for that PE 106 is added at step 526 to the LDP databases 412 from the IS-IS database 408, and all DF associated remote SPBM information for that PE 106 is added at step 528 to the IS-IS database 408 from the LDP databases 412. That is, in response to the PE switch becoming a DF for the one or more B-VIDs, the IS-IS database information locally associated with those B-VIDs is processed to generate LDP TLV information. The IS-IS database 408 and the LDP databases 412 are then synchronized at step 530 with peers of the PE 106, and processing is then returned at step 532 to step 502 to await the next IS-IS PDU.

If a DF configuration change is determined at step 506 to not be required, then a determination is made at step 508 whether the current PE is a DF for any B-VID. If the PE 106 is determined to be a DF for any B-VID, then a check is performed at step 510 to determine whether the received IS-IS PD information contains either a new SPBM service identifier or changed unicast address sub-TLV information for a B-VID for which the PE 106 is a DF. If the received IS-IS PDU is determined to contain a new SPBM service identifier or changed unicast address sub-TLV information for a B-VID for which the PE 106 is a DF, then the new or changed information for the PE 106 in the set of LDP adjacencies associated with the SPBM network is added at step 512 to the LDP databases 412 from the IS-IS database 406. Processing is then returned at step 514 to step 502 to await the next IS-IS PDU.

Figure 6:
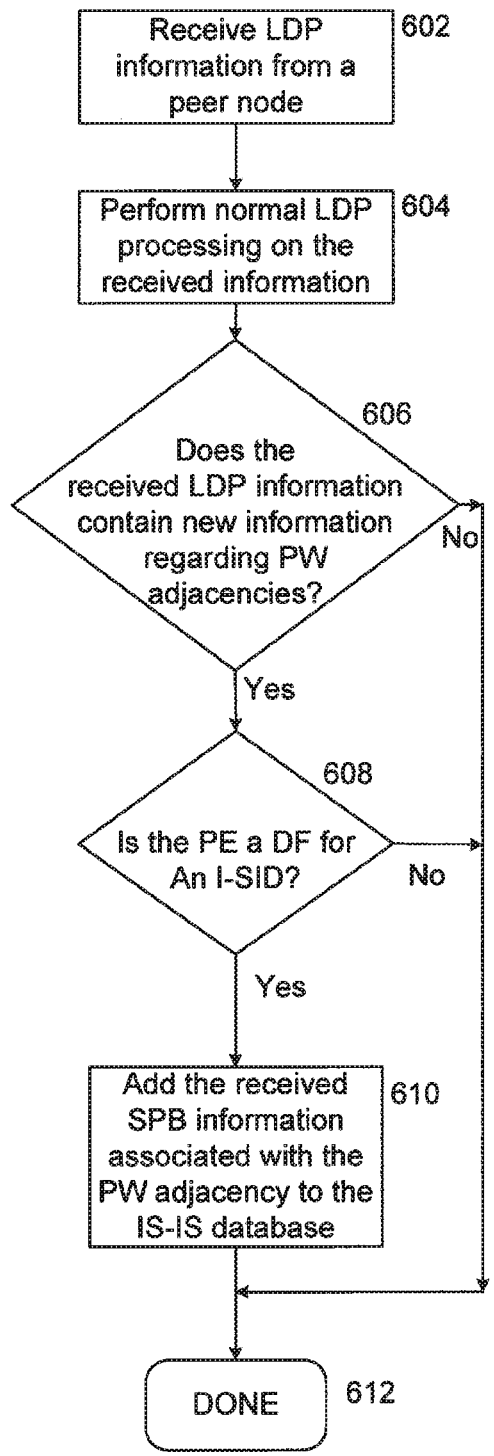
FIG. 6 is a flowchart illustrating the steps performed by a PE switch for updating Pseudowire (PW) adjacencies in accordance with exemplary embodiments of the present invention.

Referring now to FIG. 6, a flowchart of the steps performed by a provider edge switch 106 for updating pseudowire (PW) adjacencies in methods for implementing shortest path bridging over a VPLS network, in accordance with exemplary embodiments, is illustrated. The process shown in FIG. 6 begins at step 602 with the receipt, at the PE 106, of LDP information from a peer node. The received LDP information is processed in step 604 according to the normal LDP protocol. A check is made at step 606 to determine whether the received LDP information contains new information regarding PW adjacencies for the PE 106. If no new PW adjacency information has been received, then the process completes. If new PW adjacency information has been received, then a check is made at step 608 to determine whether the current PE 106 is a DF for a specified I-SID via correlating I-SID to B-VID associations advertised locally by IS-IS to determine what I-SIDs traffic will transit the DF. If the PE 106 is determined to be a DF for the I-SID, then the received SPB information associated with the PW adjacency is added at step 610 to the IS-IS database 408, and the process completes at step 612.

Similarly, in the situation where a PE 106 became the elected DF for a B-VID in an operating network 100, the IS-IS database 408 would be processed to construct the TLV information associated with the new role of the PE 106. Any PE 106 that does not need to participate in the tandem calculations can use the IS-IS overload bit to exclude SPBM tandem paths and behave as a pure interworking platform.

If the LDP database 412 has information for the I-SID, and a first instance of registration of interest in the I-SID from the SPBM-PBBN 104, 112 is occurring, then then I-SID information with that tag is processed to construct an updated set of SPBM service identifier and unicast address sub-TLVs to be advertised by the PE 106. The ISIS-SPB information is also used to keep current a local table indexed by I-SID to indicate the associated B-VID for processing of frames received from VPLS. When an I-SID is associated with more than one B-VID, only one entry is allowed in the table.

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A method for implementing Shortest Path Bridging (SPB) over a Virtual Private LAN Service (VPLS) network, comprising:
   receiving, by a provider edge (PE) switch, Intermediate System-Intermediate System (IS-IS) protocol data unit (PDU) information;
   determining, from the received IS-IS PDU information, whether a Designated Forwarder (DF) configuration for the PE switch needs to be changed and, if the DF configuration needs to be changed, the method further comprising:
   determining whether the PE switch remains a DF for one or more Backbone-Virtual Local Area Network Identifiers (B-VIDs) and, if the PE switch is no longer a DF for one or more B-VIDs, the method further comprising:
   removing all local DF associated information from at least one pseudowire (PW) adjacency's Label Distribution Protocol (LDP) database associated with the PE switch, and
   removing, from a local IS-IS database, all DF associated remote LDP information for a set of remote Provider Backbone Bridged Networks (PBBNs) associated with the PE switch; and determining whether the PE switch has become a DF for one or more of the B-VIDs and, if the PE switch has become a DF for one or more of the B-VIDs, the method further comprising:
   adding, from the IS-IS database, all local DF information for the PE switch to the at least one pseudowire (PW) adjacency's LDP database, and
   adding, from the at least one pseudowire (PW) adjacency's LDP database, all DF associated remote Shortest Path Bridging MAC Mode (SPBM) information for the PE switch to the IS-IS database.

2. The method of claim 1, further comprising performing normal IS-IS processing on the received PDU information.

3. The method of claim 1, further comprising:
   determining whether the PE switch is a DF for any B-VID; and, if the PE switch is a DF for any B-VID, the method further comprising:
   determining whether the received IS-IS PDU information includes a new Shortest Path Bridging MAC Mode (SPBM) service identifier or changed unicast address sub-Type Length Value (TLV) information and, if the IS-IS PDU information includes a new SPBM service identifier or changed unicast address sub-TLV information, the method further comprising:
   adding, from the IS-IS database to the at least one pseudowire (PW) adjacency's LDP database, the new SPBM service identifier or changed unicast address sub-TLV information.

4. The method of claim 1, further comprising:
   receiving LDP information from a peer node;
   determining whether the received LDP information includes new information regarding PW adjacencies and, if the LDP information includes new information regarding PW adjacencies, the method further comprising:
   determining whether the PE switch is a DF for an I-Component Service Identifier (I-SID) associated with the received LDP information and, if the PE switch is a DF for an I-SID associated with the received LDP information, the method further comprising:
   adding Shortest Path Bridging (SPB) information associated with the PW adjacency from the LDP information to the IS-IS database.

5. The method of claim 1, further comprising:
   synchronizing the IS-IS database and the at least one pseudowire (PW) adjacency's LDP database with peers of the PE switch after removing DF information from the IS-IS database.

6. The method of claim 1, further comprising:
   synchronizing the IS-IS database and the at least one pseudowire (PW) adjacency's LDP database with peers of the PE switch after adding DF information to the IS-IS database.

7. The method of claim 1, further comprising:
   generating an updated set of a Shortest Path Bridging MAC Mode (SPBM) service identifier and unicast address sub-Type Length Values (TLVs) to be advertised by the PE switch, in response to a first instance of registration of interest in an I-Component Service Identifier (I-SID) from a Shortest Path Bridging MAC Mode (SPBM)-Provider Backbone Bridged Network (PBBN).

8. The method of claim 1, further comprising:
   in response to the PE switch becoming a DF for one or more B-VIDs, processing the IS-IS database information locally associated with the one or more B-VIDs to generate LDP Type Length Value (TLV) information.

9. A multiprotocol label switching (MPLS) provider edge (PE) switch for implementing Shortest Path Bridging (SPB) over a Virtual Private LAN Service (VPLS) network, the PE switch comprising:
- a processor;
- a memory coupled to the processor; and
- a transceiver coupled to the processor;
- wherein the processor is configured to:
- receive Intermediate System-Intermediate System (IS-IS) protocol data unit (PDU) information;
- determine, from the received IS-IS PDU information, whether a Designated Forwarder (DF) configuration for the PE switch needs to be changed and, if the DF configuration needs to be changed, the processor further configured to:
- determine whether the PE switch remains a DF for one or more Backbone-Virtual Local Area Network Identifiers (B-VIDs) and, if the PE switch is no longer a DF for one or more B-VIDs, the processor further configured to:
- remove all local DF associated information from at least one pseudowire (PW) adjacency's Label Distribution Protocol (LDP) database associated with the PE switch, and
- remove, from a local IS-IS database, all DF associated remote LDP information for a set of remote Provider Backbone Bridged Networks (PBBNs) associated with the PE switch; and
- determine whether the PE switch has become a DF for one or more of the B-VIDs and, if the PE switch has become a DF for one or more of the B-VIDs, the processor further configured to:
- add, from the IS-IS database, all local DF information for the PE switch to the at least one pseudowire (PW) adjacency's LDP database, and
- add, from the at least one pseudowire (PW) adjacency's LDP database, all DF associated remote Shortest Path Bridging MAC Mode (SPBM) information for the PE to the IS-IS database.

10. The PE switch of claim 9, wherein the processor is further configured to perform normal IS-IS processing on the received PDU information.

11. The PE switch of claim 9, wherein the processor is further configured to:
- determine whether the PE switch is a DF for any B-VID; and, if the PE switch is a DF for any B-VID, the method further comprising:
- determine whether the received IS-IS PDU information includes a new Shortest Path Bridging MAC Mode (SPBM) service identifier or changed unicast address sub-TLV information and, if the IS-IS PDU information includes a new Shortest Path Bridging MAC Mode (SPBM) service identifier or changed unicast address sub-Type Length Value (TLV) information, the processor further configured to:
- add, from the IS-IS database to the at least one pseudowire (PW) adjacency's LDP database, new or changed information for the PE switch.

12. The PE switch of claim 9, wherein the processor is further configured to:
- receive LDP information from a peer node;
- determine whether the received LDP information includes new information regarding PW adjacencies and, if the LDP information includes new information regarding PW adjacencies, the processor further configured to:
- determine whether the PE switch is a DF for an I-Component Service Identifier (I-SID) associated with the received LDP information and, if the PE switch is a DF for an I-SID associated with the received LDP information, the processor further configured to:
- add Shortest Path Bridging (SPB) information associated with the PW adjacency from the LDP information to the IS-IS database.

13. The PE switch of claim 9, wherein the processor is further configured to synchronize the IS-IS database and the at least one pseudowire (PW) adjacency's LDP database with peers of the PE switch after removing DF information from the IS-IS database.

14. The PE switch of claim 9, wherein the processor is further configured to synchronize the IS-IS database and the at least one pseudowire (PW) adjacency's LDP database with peers of the PE switch after adding DF information to the IS-IS database.

15. The PE switch of claim 9, wherein the processor is further configured to generate an updated set of a Shortest Path Bridging MAC Mode (SPBM) service identifier and unicast address sub-Type Length Values (TLVs) to be advertised by the PE switch, in response to a first instance of registration of interest in an I-Component Service Identifier (I-SID) from a Shortest Path Bridging MAC Mode (SPBM)-Provider Backbone Bridged Network (PBBN).

16. The PE switch of claim 9, wherein the processor is further configured, in response to the PE switch becoming a DF for one or more B-VIDs, to process the IS-IS database information locally associated with one or more the B-VIDs to generate LDP Type Length Value (TLV) information.

* * * * *